United States Patent
Trim et al.

(10) Patent No.: US 11,159,674 B2
(45) Date of Patent: Oct. 26, 2021

(54) MULTI-FACTOR AUTHENTICATION OF CALLER IDENTIFICATION (ID) IDENTIFIERS

(71) Applicant: INTERNATIONAL BUSINESS MACHINES CORPORATION, Armonk, NY (US)

(72) Inventors: Craig M. Trim, Ventura, CA (US); Mauro Marzorati, Lutz, FL (US); Gary Francis Diamanti, Wake Forest, NC (US); Zachary A. Silverstein, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/433,536

(22) Filed: Jun. 6, 2019

(65) Prior Publication Data
US 2020/0389552 A1 Dec. 10, 2020

(51) Int. Cl.
*H04M 3/42* (2006.01)
*H04L 9/32* (2006.01)
(Continued)

(52) U.S. Cl.
CPC ...... *H04M 3/42042* (2013.01); *H04L 9/3228* (2013.01); *H04M 1/575* (2013.01); *H04M 3/42059* (2013.01); *H04W 4/14* (2013.01)

(58) Field of Classification Search
CPC ......... H04M 3/42042; H04M 3/42059; H04M 2203/6045; H04M 3/2281; H04M 1/57;
(Continued)

(56) References Cited

U.S. PATENT DOCUMENTS 8,458,456 B2 * 6/2013 Niccolini ............ H04L 63/0823
713/156
8,904,186 B2 12/2014 Smith et al.
(Continued)

FOREIGN PATENT DOCUMENTS

GB 2496354 A 5/2013

OTHER PUBLICATIONS

Aldwairi et al., "Multi-Factor Authentication System", https://www.researchgate.net/publication/319312344_Multi-Factor_Authentication_System, American Scientific Publishers, Aug. 2017, 7 pages.
(Continued)

*Primary Examiner* — Liton Miah
(74) *Attorney, Agent, or Firm* — Brian Restauro; Andrew D. Wright; Roberts Calderon Safran & Cole, P.C.

(57) ABSTRACT

Systems and methods for multi-factor authentication of a caller identification (ID) identifier are disclosed. In embodiments, a method includes: receiving, by a computing device of a call recipient, a call request message from a remote caller device of a caller, the call request message including an authentication token shared between the caller and the call recipient, and an identifier; authenticating the caller using the authentication token; saving an authorized caller record in an authorized caller list on the computing device, the authorized caller record including the identifier; receiving an incoming telephone call from the caller, the incoming call including a caller ID identifier; determining that the caller ID identifier matches the identifier in the authorized caller record; and initiating completion of the call based on the determining that the caller ID identifier matches the identifier in the authorized caller record.

25 Claims, 6 Drawing Sheets

(51) Int. Cl.
*H04M 1/57* (2006.01)
*H04W 4/14* (2009.01)

(58) Field of Classification Search
CPC ......... H04M 2203/6027; H04M 3/436; H04M 1/575; H04M 1/665; H04M 3/2218; H04M 3/42068; H04M 15/06; H04M 3/382; H04M 1/663; H04W 12/06; H04W 12/02; H04W 12/08; H04W 12/00514; H04W 12/0609
See application file for complete search history.

(56) References Cited

U.S. PATENT DOCUMENTS

| | | | | |
|---|---|---|---|---|
| 9,277,049 | B1* | 3/2016 | Danis | H04M 3/54 |
| 9,549,062 | B1* | 1/2017 | Yaung | H04M 3/2281 |
| 10,149,156 | B1* | 12/2018 | Tiku | H04M 3/42059 |
| 10,341,485 | B1* | 7/2019 | Patel | H04M 3/42059 |
| 2008/0181379 | A1* | 7/2008 | Chow | H04M 3/42059 379/142.05 |
| 2008/0181380 | A1* | 7/2008 | Gustave | H04L 63/0281 379/142.05 |
| 2011/0211572 | A1* | 9/2011 | Campion | H04M 15/06 370/352 |
| 2011/0261937 | A1* | 10/2011 | Chmara | H04M 15/06 379/142.01 |
| 2015/0089635 | A1 | 3/2015 | Alpert et al. | |
| 2016/0050234 | A1 | 2/2016 | Choyi et al. | |
| 2016/0269381 | A1 | 9/2016 | Paul | |
| 2017/0039568 | A1 | 2/2017 | Tunnell et al. | |
| 2017/0264443 | A1* | 9/2017 | Tu | H04L 9/3247 |
| 2020/0195776 | A1* | 6/2020 | Harrison | H04M 7/0036 |

OTHER PUBLICATIONS

Anonymous, "Multi-Factor Authentication for Mobile Phones", https://www.fordham.edu/info/26792/multifactor_authentication_for_mobile_phones, Fordham.edu, accessed May 2, 2019, 1 page.

Anonymous, "Multi Factor Authentication on Mobile Phones", https://social.msdn.microsoft.com/Forums/en-US/b7a4a765-da1d-40fd-a021-c6921ade49c5/multi-factor-authentication-on-mobilephones3. Azure Multi-Factor, MSDN, Mar. 13-23, 2016, 2 pages.

Anonymous, "Azure Multi-Factor Authentication "MFA"—Mobile App", https://social.technet.microsoft.com/wiki/contents/articles/29060.azure-multi-factorauthentication-mfa-mobile-app.aspx, accessed May 2, 2019, 2 pages.

Anonymous, "Combating Spoofed Robocalls with Caller ID Authentication", https://www.fcc.gov/call-authentication, FCC.gov, accessed Jun. 6, 2019, 5 pages.

Anonymous, "Understanding STIR/SHAKEN", https://transnexus.com/whitepapers/understanding-stir-shaken/, TransNexus, accessed Jun. 6, 2019, 4 pages.

Swearingen, "Spam Robocalls Aren't Slowing Down. Here's the Tech That Could Stop Them", http://nymag.com/intelligencer/2018/05/how-to-stop-spam-robocalls-with-stir-shaken.html, Intelligencer New York Magazine, May 16, 2018, 16 pages.

Anonymous, "Let's Encrypt and Comodo issue thousands of certificates for phishing", https://news.netcraft.com/archives/2017/04/12/lets-encrypt-and-comodo-issue-thousands-of-certificates-for-phishing.html, NetCraft, Apr. 2017, 7 pages.

Wright, "The Symantec-Google feud can't be swept under the rug", https://searchsecurity.techtarget.com/blog/Security-Bytes/The-Symantec-Google-feud-cant-be-swept-under-the-rug, TechTarget Search Security, Aug. 8, 2017, 5 pages.

* cited by examiner

MULTI-FACTOR AUTHENTICATION OF CALLER IDENTIFICATION (ID) IDENTIFIERS

BACKGROUND

The present invention relates generally to telecommunications and, more particularly, to multi-factor authentication of a caller identification (ID) identifier.

In general, caller identification (ID) is a telephone service available in analog and digital telephone systems that transmits a telephone number of a caller to the called party's telephone equipment when a call is being set up. The caller ID service may include the transmission of a name associated with the calling telephone number. The call recipient (call receiver) may inspect the information on a display of their telephone equipment before answering the call.

Nuisance calls (e.g., spam calls) encompass any type of unwanted, unsolicited telephone call. Various tools for addressing nuisance calls have been developed. One method of addressing nuisance calls is to confirm a caller's identity utilizing a multi-factor communication process including the exchange of key pairs or security tokens.

SUMMARY

In an aspect of the invention, a computer-implemented method includes: receiving, by a computing device of a call recipient, a call request message from a remote caller device of a caller, the call request message including an authentication token shared between the caller and the call recipient, and an identifier; authenticating, by the computing device of the call recipient, the caller using the authentication token; saving, by the computing device of the call recipient, an authorized caller record in an authorized caller list on the computing device, the authorized caller record including the identifier; receiving, by the computing device of the call recipient, an incoming telephone call from the caller, the incoming call including a caller identification (ID) identifier; determining, by the computing device of the call recipient, that the caller ID identifier matches the identifier in the authorized caller record; and initiating, by the computing device of the call recipient, completion of the call based on the determining that the caller ID identifier matches the identifier in the authorized caller record.

In another aspect of the invention, there is a computer program product comprising a computer readable storage medium having program instructions embodied therewith. The program instructions are executable by a computing device to cause a computing device of a call recipient to: receive a call request message from a remote caller device of a caller, the call request message including an authentication token shared between the caller and the call recipient and an identifier; authenticate the caller using the authentication token; save an authorized caller record in an authorized caller list on the computing device, the authorized caller record including the identifier; receive an incoming telephone call from the caller, the incoming call including a caller identification (ID) identifier; determine whether the caller ID identifier matches the identifier in the authorized caller record; and initiate an action by the computing device based on the determining whether the caller ID identifier matches the identifier in the authorized caller record. The action includes completing the call when the caller ID identifier matches the identifier in the authorized caller record. The action includes blocking the call when the caller ID identifier does not match the identifier in the authorized caller record.

In another aspect of the invention, there is a system including: a processor, a computer readable memory and a computer readable storage medium associated with a computing device; program instructions to generate an authentication token in response to receiving a call request message from a remote caller device of a caller and store the authentication token with an identifier associated with the caller as an authorized caller record; and program instructions to authorize a call from the caller within a predetermined time period associated with the authentication token based on a caller ID identifier matching the identifier. The program instructions are stored on the computer readable storage medium for execution by the processor via the computer readable memory.

In an aspect of the invention, a computer-implemented method includes: sending, by a computing device of a caller, a call request message to a remote device of a call recipient, the call request message including an authentication token shared between the caller and the call recipient, and an identifier; defining, by the computing device of the caller, a caller identification (ID) identifier to match the identifier; sending, by the computing device of the caller, an outgoing telephone call to the device of the call recipient, the outgoing call including the caller identification (ID) identifier; and completing, by the computing device of the caller, the call with the device of the call recipient upon the device of the call recipient determining that the caller ID identifier matches the identifier.

In another aspect of the invention, there is a computer program product including a computer readable storage medium having program instructions embodied therewith. The program instructions are executable by a computing device to cause a computing device of a caller to: send a call request message to a remote device of a call recipient, the call request message including an authentication token shared between the caller and the call recipient and an identifier; generate a caller identification (ID) identifier that matches the identifier, wherein the caller ID identifier is not an actual telephone number of the caller; send an outgoing telephone call to the call recipient based on the occurrence of a threshold event and within a predetermined time period associated with the authentication token, the outgoing call including the caller ID identifier; and complete the call with the device of the caller upon the device of the caller authenticating the caller ID identifier.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
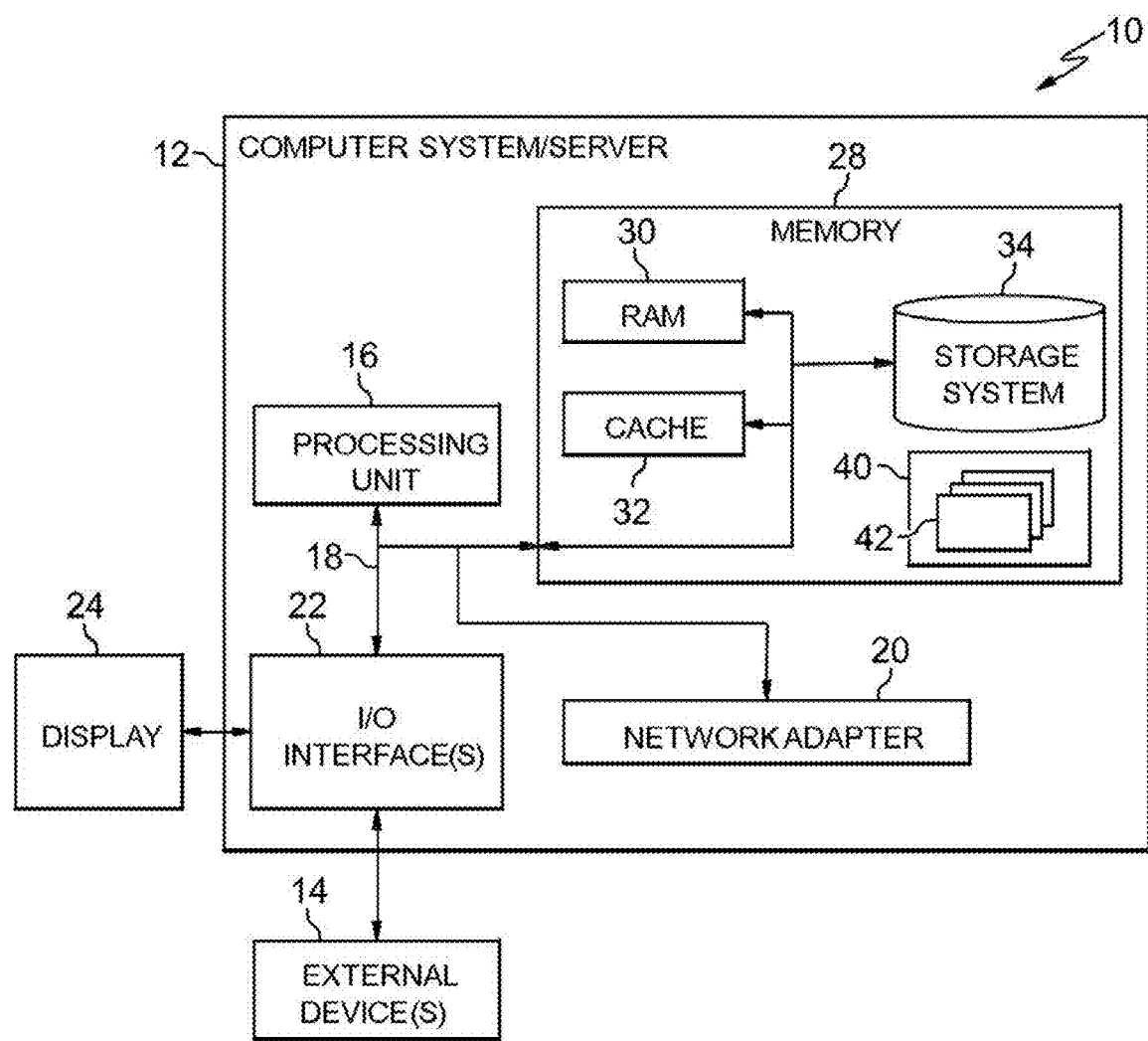
FIG. 1 depicts a computing infrastructure according to an embodiment of the present invention.

The present invention relates generally to telecommunications and, more particularly, to multi-factor authentication of a caller identification (ID) identifier. In implementations, a call initiator (caller) sends a message (e.g., a Short Message Service (SMS)/Multimedia Messaging Service (MMS)) bearing a source of their phone number with an authentication token stapled to the message and their choice of a numerical identifier (such as a fake phone number) to a call recipient. The general concept behind this first step is two-fold. The caller performs a pre-authentication step to obtain the token. The token retrieves a specific resource without requiring subsequent authentication. The caller offers the token to the call recipient. This step occurs dynamically and seamlessly behind the scenes. The call recipient then processes the received message. Processing the received message involves authentication of the source by matching the source phone number to the pre-shared authentication token. Matching may require a lookup in a local trust store if a Secure Sockets Layer (SSL) certificate is utilized, matching a time-based One Time Password (OTP), or decoding a Public Key Infrastructure (PKI)-signed message in order to extract the numerical identifier within the message, for example.

Nuisance calls are increasingly a problem in the field of telecommunications. Unbeknown to many, caller identification (ID) identifiers (e.g., telephone numbers) are defined by a caller, and may not reflect the telephone number from which the call is actually originating. Nuisance callers may utilize deceptive caller ID identifiers to fool call recipients into answering a telephone call, which they may not have otherwise answered. Accordingly, a method to restore confidence in the received caller identification (ID) identifiers to authenticate a callers' identity correctly is desired. Multi-factor authentication (MFA) is a method of confirming a user's claimed identity in which a computer user is granted access only after successfully presenting two or more pieces of evidence (or factors) to an authentication mechanism. Such MFA may include the use of authenticating knowledge (e.g., something the user and only the user knows), possession (e.g., something the user and only the user has), or inherence (e.g., something the user and only the user is).

Previous attempts to address nuisance calls include the use of continuous monitoring of statistics to detect abnormal behavior of potential nuisance callers. If such a system sees a telephone number with a high volume of calls or customer complaints, a Spam Score of the telephone number escalates quickly, and the telephone number of the caller may be blocked when the Spam Score reaches a predetermined level. However, when the nuisance caller sees productivity drop off after a telephone number is blocked, the caller may simply move the nuisance activity to a new phone number, and the process start over again. Such systems also require a critical mass of users to be effective. As nuisance callers (e.g., scammers) can quickly change telephone numbers, this solution becomes a continuous process of blocking an ever-changing array of telephone numbers.

Embodiments of the present invention utilize a novel implementation of MFA to validate the authenticity of a caller by: 1) utilizing a pre-call authentication handshake to establish trust with a mobile caller via a message (e.g., Short Message Service (SMS)/Multimedia Messaging Service (MMS)); and 2) enabling MFA tenants to be applied in a seamless manner to a mobile call.

In aspects, a call receiving program of the call recipient's device inserts a validated numerical identifier in an authorized caller list (e.g., whitelist) for a determined period (generally 5 minutes). In some embodiments, the call receiving program associates its local contact database's caller information with the chosen numerical identifier. In some embodiments, the call recipient responds to the caller with an acknowledgment message. In implementations, the caller either waits for the acknowledgment message or for a timeout to occur (e.g., 5 minutes from a time the original message (e.g., SMS/MMS) is sent to the call recipient) before initiating a call to the call recipient's phone number using regular telephone methods, but crafting their caller identification (caller ID) identifier to match their choice of a numerical identifier. In aspects, upon receiving a call from the caller, the call recipient device matches the caller ID identifier of the call with its authorized caller list and/or contact database and allows the call to ring through based on the matching. Conversely, in implementations, when a call is received that isn't recognized in the call recipient's authorized caller list and/or contact list, the call receiving program calls a validation algorithm of the recipient device used to eliminate or block nuisance (spam) callers from getting through.

In embodiments, self-registration utilized by the present invention provides the ability to have a caller "preannounce" themselves by sending a message (e.g., SMS) to the recipient that can be used for future authentication. When the call recipient gets this message, the recipient's device automatically posts a reply to the telephone number that the caller has identified themselves as, with a time sensitive token. If this is a real telephone number (e.g., not one that is being impersonated), the message is delivered and the caller receives this token. The caller is now able to initiate a call back within the allocated time frame providing the token when prompted. The combination of the two factors of the validated originating calling number coupled with the time sensitive token enables the recipient's device to receive the call, validate both pieces of information, and if correct, pass the call through and allow the recipient's device to receive the call and ring.

Thus, embodiments of the invention advantageously provide technical solutions to the technical problem of authenticating telephone callers. Implementations of the present invention constitute improvements in the technical field of telecommunications by providing unconventional authentication steps to authenticate a caller's identity utilizing caller ID identifiers. Embodiments of the present invention advantageously provide for authentication of a caller at the call recipient's device, without the need to rely on any third party authentication. Accordingly, such embodiments eliminate the need to place trust in a potentially insecure third party to authenticate incoming calls.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessorbased systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
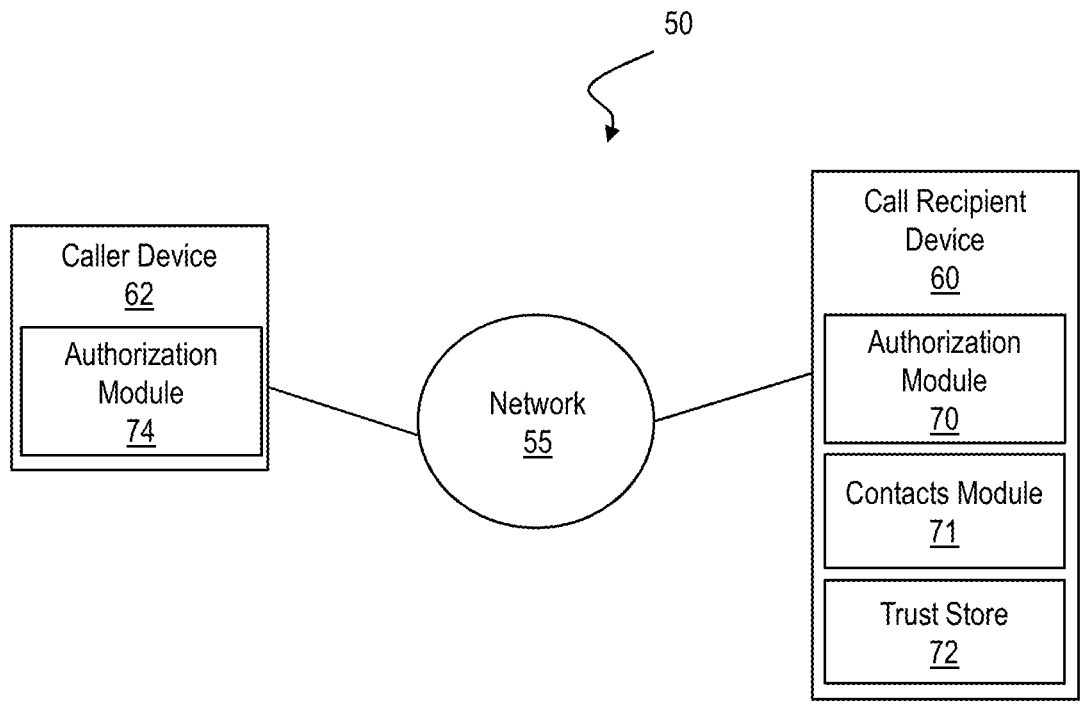
FIG. 2 shows an exemplary environment in accordance with aspects of the invention.

FIG. 2 shows an exemplary caller authentication environment 50 in accordance with aspects of the invention. The environment 50 includes a network 55 (e.g., telecommunications network) connecting a call recipient device 60 (hereafter recipient device 60) with a caller device 62. While only one caller device 62 and recipient device 60 are depicted, it should be understood that any number of caller and caller recipient devices may be present in the caller authentication environment 50. The recipient device 60 and the caller device 62 may be any caller ID enabled telecommunications device, such as a telephone, smartphone, tablet, personal computer, desktop computer, etc. In implementations, the recipient device 60 and/or the caller device 62 each comprises one or more elements of the computer system 12 of FIG. 1, and is connected to the network 55 via the network adapter 20 of FIG. 1.

The network 55 may be any suitable communication network or combination of networks, such as a local area network (LAN), a general wide area network (WAN), a public network (e.g., the Internet), and/or public switched telephone network (PSTN).

Still referring to FIG. 2, the recipient device 60 and the caller device 62 may include one or more program modules (e.g., program module 42 of FIG. 1) executed by the respective recipient device 60 and caller device 62 to perform one or more of the functions described herein. In embodiments, the recipient device 60 includes an authorization module 70 configured to perform one or more of the authorization/authentication steps described herein, a contacts module 71 configured to maintain a list of contacts and associated contact information for the call recipient (e.g., owner of the call recipient device) including authorized callers, and a trust store 72 configured to store authentication information for use in authentication steps of the present invention. In embodiments, the caller device 62 includes an authorization module 74 configured to perform one or more of the authorization/authentication steps described herein.

In embodiments, the recipient device 60 and the caller device 62 may include additional or fewer components than those shown in FIG. 2, including software or hardware for telecommunication functions. In embodiments, separate components may be integrated into a single computing component or module. Additionally, or alternatively, a single component may be implemented as multiple computing components or modules. Moreover, the quantity of devices and/or networks in the environment 50 is not limited to what is shown in FIG. 2. In practice, the environment 50 may include additional devices and/or networks; fewer devices and/or networks; different devices and/or networks; or differently arranged devices and/or networks than illustrated in FIG. 2.

Figure 3:
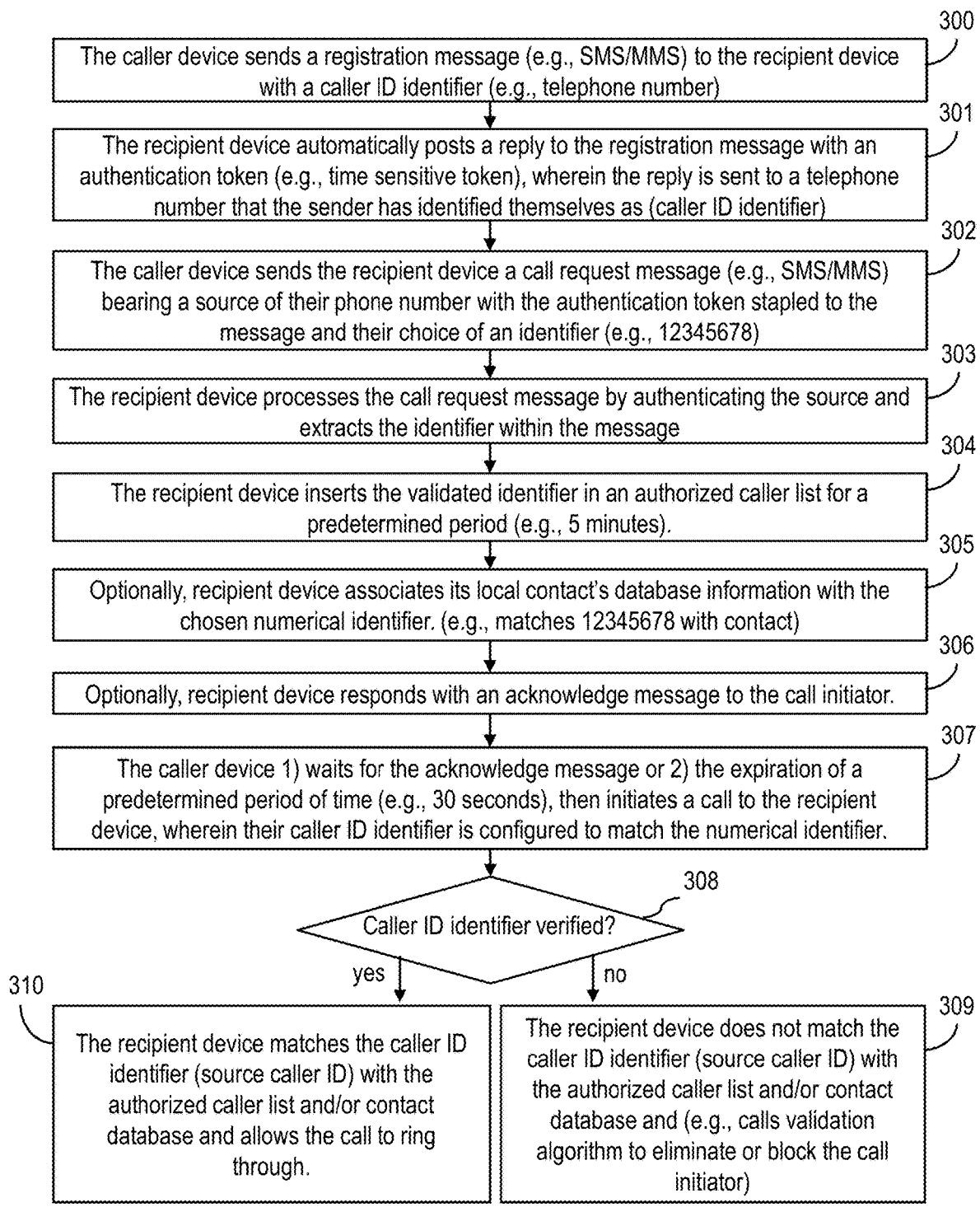
FIG. 3 shows a flowchart of steps of an exemplary method in accordance with aspects of the invention.

FIG. 3 shows a flowchart of an exemplary method in accordance with aspects of the invention. Steps of the method of FIG. 3 may be performed in the environment 50 illustrated in FIG. 2, and are described with reference to elements shown in FIG. 2.

At step 300, the caller device 62 of a caller sends a registration message to the recipient device 60 of an intended call recipient with a caller ID identifier. In embodiments, the authorization module 74 of the caller device 62 performs step 300. The term caller ID identifier as used herein refers to text-based characters (e.g., a phone number) associated with a caller (caller device 62) utilized in a caller ID telephone service, wherein the text-based characters are displayed on a display of the recipient device 60 during the process of a call being set up between the caller device 62 and the recipient device 60. In implementations, the caller ID identifier includes a telephone number for the caller. The purpose of the registration message is to initiate an initial verification of the caller's identity (pre-authentication) for use in future authentication steps. The content of the registration message may vary, depending on the type of initial authentication/verification process utilized.

At step 301, the recipient device 60 automatically posts a reply to the registration message of step 300 with an authentication token, wherein the reply is sent to a telephone number (e.g., 976-555-1212) identified in the caller ID identifier. The term authentication token as used herein refers to data that may be utilizing to verify the caller's identity, such as a key in a public key infrastructure (PKI) process or other similar user verification data. In embodiments, the authorization module 70 implements step 301. In aspects, the recipient device 60 automatically generates the authentication token in response to the registration message and saves the authentication token in the trust store 72 of the recipient device 60 with caller information (e.g., the telephone number of the caller) for later reference.

In implementations, the registration message of step 301 is an SMS message or MMS message. In other implementations, an out of band token exchange is made through other protocols such as email, near field communication (NFC), or Bluetooth of an authentication token, wherein the registration message can be as simple as a short string of characters, or as convoluted as cryptographically strong tokens such as public keys, etc. The authentication token may take a variety of forms, depending on the type of initial verification/authentication process utilized. In implementations, the authentication token is a time-sensitive token having an expiration set for a predetermined period of time (e.g., 5 minutes) after an initial time (e.g., the time of issuance of the authentication token by the recipient device 60).

At step 302, the caller device 62 sends the recipient device 60 a call request message bearing a source of their phone number (e.g., 976-555-1212) with the authentication token appended (e.g., "stapled") to the call request message and the caller's choice of an identifier (e.g., 12345678). In some embodiments, the authentication token is an "outbound" token, and the caller's choice of an identifier is a made up phone number. In implementations, the call request message is in the form of a SMS or MMS. The identifier may be in the form of a caller ID identifier. In aspects the authorization module 74 of the caller device 62 implements step 302. In aspects, the identifier can be any numeric, alphabetic, or alpha-numeric identifier chosen by the caller.

At step 303, the recipient device 60 processes the call request message of step 302 by authenticating the source of the call request message, and extracting the identifier (e.g., 12345678) within the call request message. In implementations, authenticating the source of the call request message comprises matching the telephone number (e.g., 976-555-1212) identified in the call request message with a registered telephone number in the trust store 72. Once the source of the call is authenticated, the identifier is recognized as a validated identifier by the recipient device 60. In aspects, the authorization module 70 of the recipient device 60 implements step 303.

At step 304, the recipient device 60 inserts the validated identifier (e.g., 12345678) of step 303 into an authorized caller list (e.g., whitelist) in the trust store 72. In implementations, the validated identifier is associated with a predetermined time period (e.g., 5 minutes) in the authorized caller list, wherein the identifier is no longer valid or expires after the predetermined time period. The term authorized caller list as used herein refers to a list of authorized callers (whitelist) and associated data, including the validated identifier. In aspects, the authorization module 70 of the recipient device 60 implements step 304.

At step 305, the recipient device 60 optionally associates the caller with a matching contact in a contact list of the recipient device 60, wherein the contact list links the contact with the validated identifier (e.g., for the predetermined time period) of the caller based on the authentication of the source of the call at step 303. For example, the recipient device 60 may match the telephone number (e.g., 976-555-1212) identified in the call request message with a telephone number in the contact list of the recipient device 60, and store the validated identifier with the telephone number in the contact list. In implementations, the recipient device 60 stores the authentication token received in the call request message in the contact list of the recipient device 60, along with the caller's bona fide telephone number(s) (e.g., 976-555-1212) and other contact information. In some implementations, the tokens of the caller may not be common for all recipients, but may be uniquely distributed to each recipient. In such embodiments, the recipient device 60 stores both the "inbound" token given by the recipient in step 301, but also stores the "outbound" token given to the recipient in step 302.

At step 306, the recipient device 60 optionally responds to the call request message of step 302 with an acknowledge message (e.g., SMS or MMS) to the caller device 62. The acknowledge message can be in any form configured to communicate to the caller device 62 that the call request message was received and/or processed by the recipient device 60.

At step 307, the caller device 62 initiates a call to the recipient device 60 after a threshold event occurs, wherein the caller ID identifier of the caller device 62 is configured by the caller to match the identifier (e.g., 12345678) from the call request message of step 302. In aspects, the threshold event is an acknowledge message received from the recipient device 60 in accordance with step 306. In other embodiments, the threshold event is an expiration of a predetermined period of time (e.g., 30 seconds after the caller device 62 sends the call request message).

At step 308, the recipient device 60 attempts to verify the caller ID identifier of the caller device 62 in response to receiving the call of step 307. In implementations, verification includes the recipient device 60 comparing the caller ID identifier of the caller (caller device 62) with the authorized caller list in the trust store 72 to determine if the caller ID identifier matches data for a pre-authorized caller (previously authenticated caller) in the authorized caller list. In implementations, verification includes the recipient device 60 comparing the caller ID identifier of the caller (caller device 62) with a contacts list of the recipient device 60 to determine if the caller ID identifier matches data for a pre-authorized caller in the contact list. In embodiments, the authorization module 70 of the recipient device 60 implements step 308.

At step 309, if the recipient device 60 cannot verify the caller ID identifier at step 308, (e.g., the caller ID identifier does not match data for a pre-authorized caller in the authorized caller list and/or contact list) the recipient device 60 blocks the call of step 307 from completing (e.g., ringing), or allows the call to occur without validation. In aspects, the recipient device 60 issues a notification to the call recipient (e.g., a notification displayed on a screen of the recipient device 60) indicating that the incoming call is not validated. In implementations, the authorization module 70 calls a validation algorithm of the recipient device 60 to terminate the call or block completion of the call based on a failed verification attempt at step 308.

At step 310, if the recipient device 60 does verify the caller ID identifier at step 308 (e.g., the caller ID identifier does match data for a pre-authorized caller in the authorized caller list and/or contact list), the recipient device 60 completes the call of step 307 (e.g., lets the call ring through to the call recipient). The completion of the call (e.g., ring through) may be performed in accordance with existing telephone calling procedures. In implementations, the authorization module 70 of the recipient device 60 initiates the completion of the call according to step 310. In implementations, the recipient device 60 sends the recipient of the incoming call a notification, or otherwise indicates to the recipient, that the call of step 308 is verified.

Figure 4:
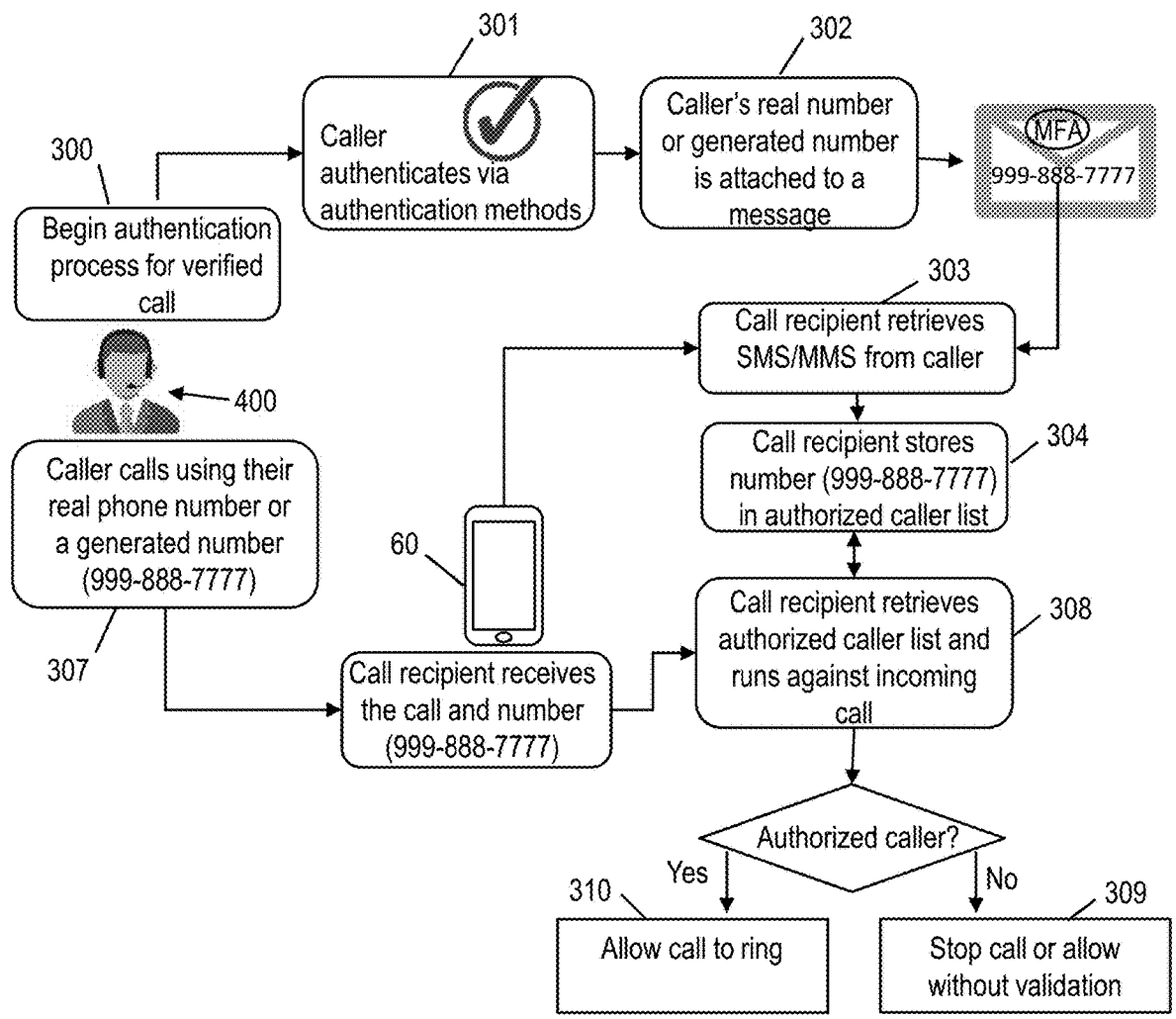
FIG. 4 is a flowchart depicting an exemplary scenario in accordance with embodiments of the present invention.

FIG. 4 is a flowchart depicting an exemplary scenario in accordance with embodiments of the present invention. The scenario of FIG. 4 is implemented in accordance with steps of FIG. 3 and in accordance with the environment 50 of FIG. 2.

In the scenario of FIG. 4, a caller 400 (e.g., using caller device 62) calls the recipient device 60 using either their real phone number or a generated phone number (e.g., 976-555-1212) as a caller ID identifier in accordance with step 307 of FIG. 3. The caller 400 also initiates an authentication process to verify the call in accordance with step 300 of FIG. 3. The caller 400 authenticates their number (976-555-1212) by receiving an authentication token in accordance with step 301 of FIG. 3. The caller's real or generated number (976-555-1212) is attached to a call request message in the form of a SMS or MMS and the message is sent to the recipient device 60 along with the shared authentication token, in accordance with step 302 of FIG. 3. The recipient device 60 retrieves and processing the SMS message in accordance with step 303 of FIG. 3, and the number of the caller (976-555-1212) is input (whitelisted) into an authorized caller list stored at the recipient device 60 in accordance with step 304 of FIG. 3.

Still referencing FIG. 4, in response to receiving a call from the caller 400 in accordance with step 307 of FIG. 3, the recipient device 60 retrieves the stored authorized caller list and runs it against the caller ID identifier 976-555-1212 from the incoming call in accordance with step 308. In accordance with step 310 of FIG. 3, if the call ID identifier 976-555-1212 matches an authorized caller in the authorized caller list, the recipient device 60 allows the call to ring through to the call recipient. Conversely, in accordance with step 309 of FIG. 3, if the caller ID identifier 976-555-1212 does not match an authorized caller in the authorized caller list the recipient device 60 sends a message to the user indicating that the call is not validated while letting the call ring through, or stops the call from ringing through to the intended call recipient.

Figure 5:
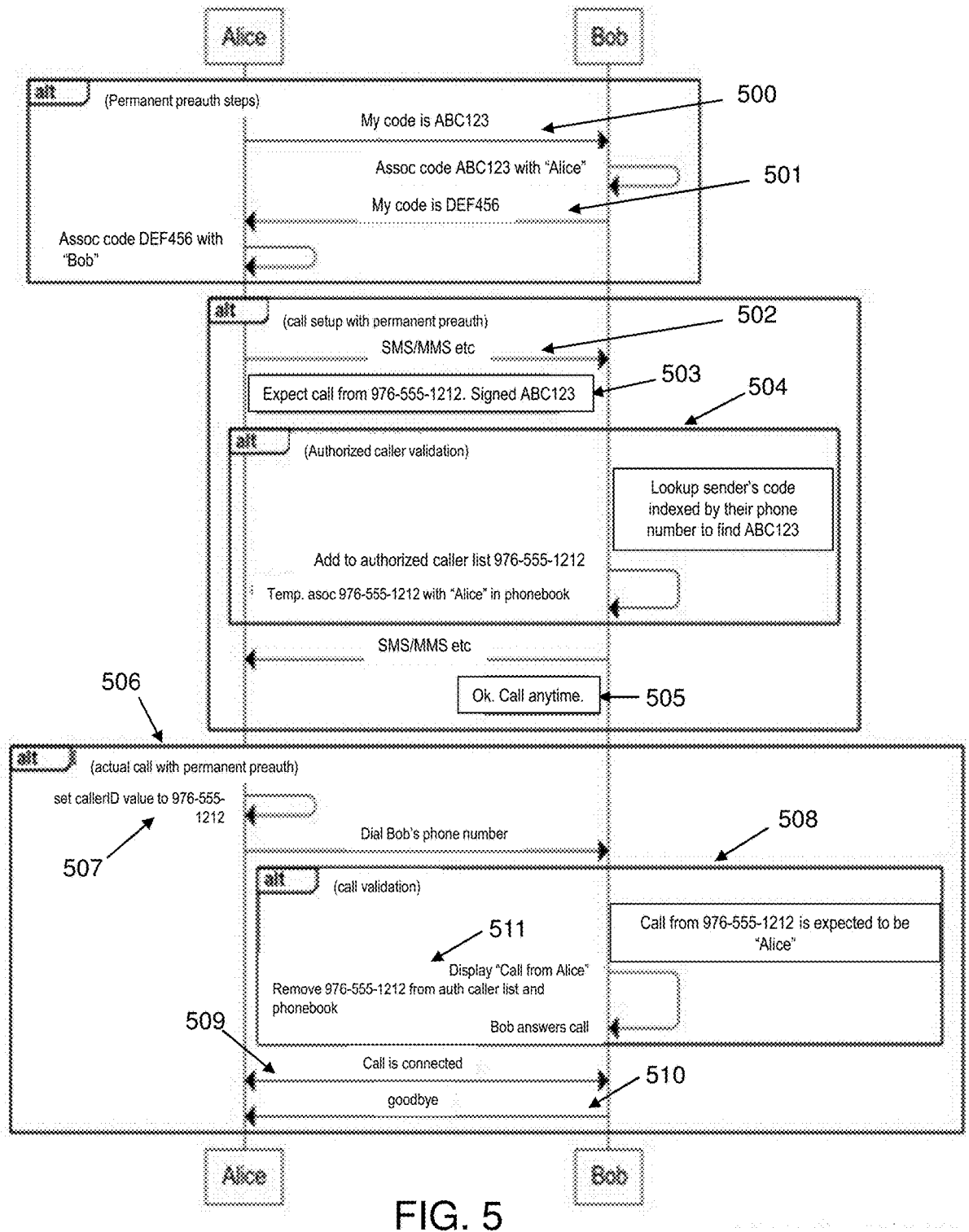
FIG. 5 is a flow diagram representing an exemplary permanent pre-authentication scenario in accordance with embodiments of the invention.

FIG. 5 is a flow diagram representing an exemplary permanent pre-authentication scenario in accordance with embodiments of the invention. In the example of FIG. 5, a first party caller Alice (e.g., caller device 62) performs pre-authentication steps with a second party call recipient Bob (e.g., call recipient device 60) in accordance with FIG. 3. More specifically, Alice sends a code ABC123 to Bob at 500, and Bob responds with the code DEF456 (authentication token) at 501. The caller device 62 of Alice associates the code DEF456 (authentication token) with Bob, and stores the pre-authentication code DEF456 a memory store of the caller device 62. Alice then sends an SMS at 502 sourcing from her own bona fide phone number to a phone number of Bob (e.g., call recipient device 60) bearing a message 503 including two pieces of information: the shared token ABC123 previously agreed upon, and the chosen made up phone number 976-555-1212 (identification) that will be used by Alice. The recipient device 60 validates that the received token ABC123 matches the previously exchanged value for the bona fide phone number of Alice, and associates the number 976-555-1212 temporarily with Alice in an authorized caller list (whitelist) of the recipient device 60 and in Bob's stored phonebook (contact list) at 504. In this scenario, the recipient device 60 of Bob responds to Alice's SMS message 505 with an acknowledgement "Ok. Call anytime." Alice then calls Bob at 506, using the caller-defined caller ID identifier 507 of 976-555-1212. Bob's recipient device 60 receives the call and validates the call at 508 based on the record in Bob's authorized caller list (whitelist) and phonebook associating Alice with the number 976-555-1212. Bob's recipient device 60 enables Bob to answer the call from Alice and the call is connected at 509. In this scenario, the recipient device 60 recognizes the calling number from the permanent contact list's record (authorized caller list and contact list), connects the call, and allows it to ring through with the preferences from the contact list (e.g., custom ring tone for Alice, etc.). At 510 the call ends. In the scenario of FIG. 5, upon the call being answered by Bob, the recipient device 60 causes the phone number to be removed from the permanent contact record in the authorized caller list and phonebook as indicated at 511.

Figure 6:
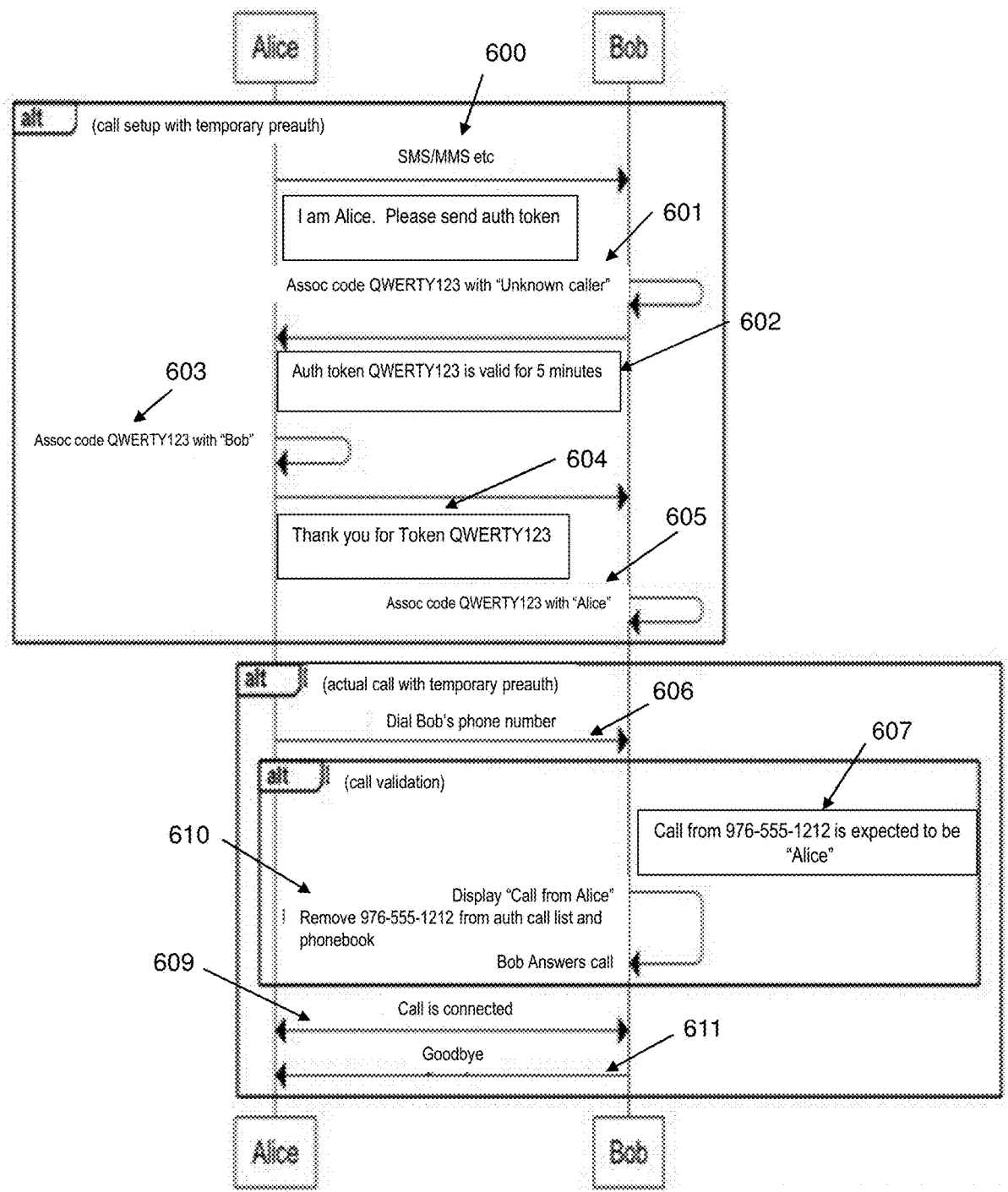
FIG. 6 is a flow diagram representing an exemplary temporary pre-authentication scenario in accordance with embodiments of the invention.

FIG. 6 is a flow diagram representing an exemplary temporary pre-authentication scenario in accordance with embodiments of the invention. In the scenario of FIG. 6, the first party caller Alice (e.g., caller device 62) performs pre-authentication steps with the second party call recipient Bob (e.g., recipient device 60) in accordance with FIG. 3. More specifically, Alice sends an SMS, MMS 600 or other message type "I am Alice. Please send auth token" to Bob to request an authorization token. Bob, having no stored pre-shared tokens onboard associated with Alice, issues a temporary authentication token "QWERTY123" at 601, which is valid for a short timeframe. Although an alpha numeric code is used as the token in FIG. 6, it should be understood that a numeric value could be used, such as "32767", for example. Bob's recipient device 60 then responds at 602 with an SMS or other type of message sourcing from their own bona fide phone number with the token "QWERTY123" (or the numerical value 32767), and the time-to-live value (e.g., 5 minutes).

In the scenario of FIG. 6, Alice's caller device 62 will return the authentication token "QWERTY123" intact to Bob's recipient device 60 and associates the token "QWERTY123" with Bob in memory storage of the caller device 62 at 603. However, in alternative embodiments, Alice's caller device 62 would compute a new numerical value by increasing the received value by a known step value, e.g., "add one", return the modified authentication token in a response to Bob, and save the modified token associated with Bob in the memory storage of the recipient device 60 at 603.

With continued reference to FIG. 6, the caller device 62 of Alice associates the authentication token QWERTY123 with Bob and issues a confirmation message 604 to Bob indicating receipt of the authentication token "QWERTY123". At 605, Bob's recipient device 60 validates that the received authentication token QWERTY123 matches the issued authentication token QWERTY123 (or the modified authentication token), and adds the bone fide number 976-555-1212 for Alice to the device's onboard contact list (e.g., in trust store 72) temporarily for "Alice".

In the scenario of FIG. 6 where a temporary pre-authentication is received by Alice, the caller device 62 of Alice executes a call to Bob at 606, transmitting Alice's bona fide phone number as a caller ID identification (string). Bob's recipient device 60 recognizes the calling number 976-555-1212 from the temporary authorization list (onboard contact list) at 607, and connects the call at 609 to allow the call to ring through to Bob. In the scenario of FIG. 6, when Bob answers the call, the recipient device 60 causes the temporary authorization stored in the recipient device 60 to expire in the onboard contact list, as indicated at 610. The call is ended at 611.

In accordance with the above-identified embodiments, when making a call where temporary pre-authentication is received, the first party caller device 62 (Alice) executes a call as per usual when placing a call, transmitting their own bona fide phone number 976-555-1212 as the caller ID identifier (string). The recipient (Bob) will recognize the calling number from their temporary authorization list, connect the call, and allow it to ring through. When the user (the second party recipient) answers the call, the authorization is expired on the second party recipient's contact list. On the other hand, in embodiments where permanent pre-authentication is in place, the first party caller (Alice) executes a call as per usual except that the transmitted caller ID identifier (string) is the agreed made up phone number. The recipient (Bob) will recognize the calling number from the permanent contact list's record, connect the call, and allow it to ring through with the preferences for the contact (custom ring for the particular recognized contact, etc.). Upon the call being answered, the made up phone number is removed from the permanent contact's record.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for multi-factor authentication of a caller identification (ID) identifier. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In embodiments, a computer-implemented method of the present invention includes: in response to a communication exchange token between a first user and a second user, generating a pre-defined, shared token between the first and the second user; and authenticating a message from the first user to the second user by transmitting a message from the first user that comprises: content, the generated pre-defined shared token, and a number associated with the first user. The method may further include: in response to receiving the message from the first user, authorizing the first user for communication with the second user for a pre-determined amount of time. In aspects, the authenticating the message includes: validating that a received pre-defined, shared token matches the generated pre-defined shared token between the first and the second user; and associated the number associated with the first user with the second user's contact record. In implementations, the method further includes: requesting authorization for communication from a third user to the second user; in response to a request for authorization for communication between a third user and the second user, issuing a temporary token that is valid for a specified time period to the third user; and in response to receiving the temporary token, validating the received temporary token. In aspects, the method further includes, in response to a request for authorization for communication between a third user and the second user, issuing a numerical value and a specified time period for authorization to the third user; and in response to receiving the numerical value and specified time period, incrementing the numerical value by a known step value; matching the known step values of the first user and the third user; and storing the third user's contact information in the first user's contact list.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computing device of a call recipient, a call request message from a remote caller device of a caller, the call request message including an authentication token pre-shared between the caller and the call recipient, and a user selected identifier;
authenticating, by the computing device of the call recipient, the caller using the authentication token, wherein the authentication token comprises user verification data for use in verifying an identity of the caller;

saving, by the computing device of the call recipient, an authorized caller record in an authorized caller list on the computing device in response to the authentication, the authorized caller record including the identifier, for a predetermined period of time;

receiving, by the computing device of the call recipient, an incoming telephone call from the caller, the incoming call including a caller identification (ID) identifier;

determining, by the computing device of the call recipient, that the caller ID identifier matches the user selected identifier in the authorized caller record; and initiating, by the computing device of the call recipient, completion of the call based on the determining that the caller ID identifier matches the user selected identifier in the authorized caller record.

2. The computer-implemented method of claim 1, further comprising deleting, by the computing device of the call recipient, the authorized caller record based on at least one of the group consisting of: the completion of the call and an expiration of the authentication token.

3. The computer-implemented method of claim 1, further comprising:

performing pre-authentication, by the computing device of the call recipient, prior to receiving the call request message, the pre-authentication comprising:

receiving, by the computing device of the call recipient, a registration message from the caller, the registration message including the caller ID identifier;

automatically replying, by the computing device of the call recipient, to the registration message with the authentication token; and storing, by the computing device of the call recipient, the authentication token in a trust store of the computing device.

4. The computer-implemented method of claim 3, wherein the authenticating the caller using the authentication token comprises matching the authentication token received with the call request message with the authentication token stored in the trust store of the computing device.

5. The computer-implemented method of claim 1, wherein the authorized caller record further comprises a predetermined time period before expiration of the authentication token.

6. The computer-implemented method of claim 5, further comprising sending, by the computing device of the call recipient, an acknowledge message in response to receiving the call request message, the acknowledgement message including an indication of the predetermined time period.

7. The computer-implemented method of claim 1, wherein the caller ID identifier is a caller-defined number that is not the same as an actual telephone number of the caller.

8. The computer-implemented method of claim 1, wherein the call request message is a short message service (SMS) or multimedia messaging service (MMS) message.

9. A computer program product comprising a computer readable storage medium having program instructions embodied therewith, the program instructions executable by a computing device of a call recipient to cause the computing device of the call recipient to:

receive a call request message from a remote caller device of a caller, the call request message including an authentication token pre-shared between the caller and the call recipient and a user selected identifier, wherein the authentication token comprises user verification data for use in verifying an identity of the caller;

authenticate the caller using the authentication token;

save, for a predetermined period of time, an authorized caller record in an authorized caller list on the computing device in response to the authentication, the authorized caller record including the user selected identifier;

receive an incoming telephone call from the caller, the incoming call including a caller identification (ID) identifier;

determine whether the caller ID identifier matches the user selected identifier in the authorized caller record; and initiate an action by the computing device based on the determining whether the caller ID identifier matches the user selected identifier in the authorized caller record, wherein:

the action comprises completing the call when the caller ID identifier matches the user selected identifier in the authorized caller record; and the action comprises blocking the call when the caller ID identifier does not match the user selected identifier in the authorized caller record.

10. The computer program product of claim 9, further comprising program instructions to cause the computing device to delete the authorized caller record based on at least one of the group consisting of: the completion of the call and an expiration of the authentication token.

11. The computer program product of claim 9, further comprising program instructions to cause the computing device to:

perform pre-authentication prior to receiving the call request message, the pre-authentication comprising:

receiving a registration message from the caller, the registration message including the caller ID identifier;

automatically replying to the registration message with the authentication token; and storing the authentication token in a trust store of the computing device.

12. The computer program product of claim 11, wherein the authenticating the caller using the authentication token comprises matching the authentication token received with the call request message with the authentication token stored in the trust store of the computing device.

13. The computer program product of claim 9, wherein the authorized caller record further comprises a predetermined time period before expiration of the authentication token.

14. The computer program product of claim 13, further comprising instructions to cause the computing device to send an acknowledge message in response to receiving the call request message, the acknowledgement message including an indication of the predetermined time period.

15. The computer program product of claim 9, wherein the caller ID identifier is a caller-defined number that is not the same as an actual telephone number of the caller.

16. The computer program product of claim 9, wherein the call request message is a short message service (SMS) or multimedia messaging service (MMS) message.

17. A system comprising:

a processor, a computer readable memory and a computer readable storage medium associated with a computing device of a call recipient;

program instructions to generate an authentication token in response to receiving a call request message from a remote caller device of a caller and store the authentication token with a user selected identifier associated with the caller as an authorized caller record for a predetermined period of time, wherein the authentication token comprises user verification data for use in verifying an identity of the caller; and program instructions to authorize a call from the caller within a predetermined time period associated with the authentication token based on a caller ID identifier matching the user selected identifier;

wherein the program instructions are stored on the computer readable storage medium for execution by the processor via the computer readable memory.

18. The system of claim 17, further comprising program instructions to delete the authorized caller record based on at least one of the group consisting of: the completion of the call and an expiration of the authentication token.

19. The system of claim 17, further comprising:

program instructions to perform pre-authentication prior to receiving the call request message, the pre-authentication comprising:
  automatically replying to a registration message received from the caller with the authentication token; and
  storing the authentication token in a trust store of the computing device.

20. The system of claim 17 further comprising program instructions to send an acknowledge message in response the call request message, the acknowledgement message including an indication of the predetermined time period.

21. A computer-implemented method comprising:

sending, by a computing device of a caller, a call request message to a remote device of a call recipient, the call request message including an authentication token pre-shared between the caller and the call recipient, and a user selected identifier, wherein the authentication token comprises user verification data for use in verifying an identity of the caller;

defining, by the computing device of the caller, a caller identification (ID) identifier to match the user selected identifier;

sending, by the computing device of the caller, an outgoing telephone call to the device of the call recipient, the outgoing call including the caller identification (ID) identifier; and completing, by the computing device of the caller, the call with the device of the call recipient upon the device of the call recipient determining that the caller ID identifier matches the user selected identifier.

22. The computer-implemented method of claim 21, further comprising:

performing pre-authentication, by the computing device of the caller, prior to sending the call request message, the pre-authentication comprising:
  sending, by the computing device of the caller, a registration message to the device of the call recipient, the registration message including the caller ID identifier;
  receiving, by the computing device of the caller, a reply to the registration message with the authentication token; and
  storing, by the computing device of the caller, the authentication token in a record associated with the caller.

23. The computer-implemented method of claim 22, further comprising receiving, by the computing device of the caller, an acknowledge message in response to the call request message, the acknowledgement message including an indication of a predetermined time period before expiration of the authentication token.

24. A computer program product comprising a computer readable storage medium having program instructions embodied therewith, the program instructions executable by a computing device of a caller to cause the computing device of the caller to:

send a call request message to a remote device of a call recipient, the call request message including an authentication token pre-shared between the caller and the call recipient and a user selected identifier, wherein the authentication token comprises user verification data for use in verifying an identity of the caller;

generate a caller identification (ID) identifier that matches the user selected identifier, wherein the caller ID identifier is not an actual telephone number of the caller;

send an outgoing telephone call to the call recipient based on the occurrence of a threshold event and within a predetermined time period associated with the authentication token, the outgoing call including the caller ID identifier; and complete the call with the device of the caller upon the device of the caller authenticating the caller ID identifier.

25. The computer program product of claim 24, wherein the program instructions further cause the computing device to determine a predetermined time period before expiration of the authentication token based on an acknowledge message received from the call recipient in response to the call request message.

* * * * *